United States Patent
Dutta et al.

(10) Patent No.: US 9,633,048 B1
(45) Date of Patent: Apr. 25, 2017

(54) CONVERTING A TEXT SENTENCE TO A SERIES OF IMAGES

(71) Applicant: Adobe Systems Incorporated, San Jose, CA (US)

(72) Inventors: Siddhartha Kumar Dutta, Thane (IN); Midhun Gundapuneni, Hyderabad (IN); Harsh Jhamtani, Kanpur (IN); Shubham Varma, Ahmedabad (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/941,955

(22) Filed: Nov. 16, 2015

(51) Int. Cl.
*G06F 17/28* (2006.01)
*G06F 17/20* (2006.01)
*G06F 17/27* (2006.01)
*G06F 17/30* (2006.01)

(52) U.S. Cl.
CPC ...... *G06F 17/30265* (2013.01); *G06F 17/271* (2013.01); *G06F 17/274* (2013.01); *G06F 17/2785* (2013.01); *G06F 17/30247* (2013.01)

(58) Field of Classification Search
CPC ............ G06F 17/2785; G06F 17/2735; G06F 17/2775; G06F 17/274; G06F 17/2755; G06F 17/2705; G06F 17/241; G06F 17/30684
USPC ..................... 704/3, 4, 5, 8, 9, 10
See application file for complete search history.

(56) References Cited

U.S. PATENT DOCUMENTS

| | | | | |
|---|---|---|---|---|
| 7,912,705 B2* | 3/2011 | Wasson | ................. | G06F 17/241 704/9 |
| 8,041,697 B2* | 10/2011 | Rayner | ............. | G06F 17/30616 704/9 |
| 8,144,990 B2* | 3/2012 | Englund | ............... | G06F 17/289 382/181 |
| 8,239,201 B2* | 8/2012 | Conkie | ................. | G06F 3/0482 345/168 |
| 8,335,754 B2* | 12/2012 | Dawson | ............. | G06F 17/2705 706/45 |
| 8,635,058 B2* | 1/2014 | Patel | .................. | G06Q 30/0283 704/10 |

(Continued)

OTHER PUBLICATIONS

Lu, Xin et al., "Visualizing Textual Travelogue with Location-Relevant Images", Proceedings of the 2009 International Workshop on Location Based Social Networks, 2009, pp. 65-68.

(Continued)

*Primary Examiner* — Edgar Guerra-Erazo
(74) *Attorney, Agent, or Firm* — Finch & Maloney PLLC

(57) ABSTRACT

A text sentence is automatically converted to an image sentence that conveys semantic roles of the text sentence. This is accomplished by identifying semantic roles associated with each verb of a sentence, any associated verb adjunctions, and identifying the grammatical dependencies between words and phrases in a sentence, in some embodiments. An image database, in which each image is tagged with descriptive information corresponding to the image depicted, is queried for images corresponding to the semantic roles of the identified verbs. Unless a single image is found to depict every semantic role, the text sentence is split into two smaller fragments. This process is the repeated and performed recursively until a number of images have been identified that describe each semantic role of each sentence fragment.

18 Claims, 7 Drawing Sheets

(56) References Cited

U.S. PATENT DOCUMENTS

| | | | | |
|---|---|---|---|---|
| 8,959,043 B2* | 2/2015 | Ferrucci | ............ | G06N 7/005 706/46 |
| 8,972,321 B2* | 3/2015 | Ferrucci | ............ | G06N 7/005 706/46 |
| 9,087,046 B2* | 7/2015 | Solntseva | ............ | G06F 17/28 |
| 9,239,833 B2* | 1/2016 | Cuthbert | ............ | G06F 17/289 |
| 9,251,144 B2* | 2/2016 | Du | ............ | G06F 3/0488 |
| 9,292,498 B2* | 3/2016 | Escobedo | ............ | G06F 17/289 |
| 9,519,641 B2* | 12/2016 | Solntseva | ............ | G06F 17/289 |
| 9,547,644 B2* | 1/2017 | Cuthbert | ............ | G06F 17/289 |
| 2008/0233980 A1* | 9/2008 | Englund | ............ | G06F 17/289 455/466 |
| 2009/0138454 A1* | 5/2009 | Rayner | ............ | G06F 17/30616 |
| 2010/0228693 A1* | 9/2010 | Dawson | ............ | G06F 17/2705 706/12 |
| 2012/0163668 A1* | 6/2012 | Englund | ............ | G06F 17/289 382/103 |

OTHER PUBLICATIONS

Mikolov, Thomas et al., "Distributed Representations of Words and Phrases and their Compositionality", Advances in neural information processing systems, 2013, pp. 1-9.

Klein, Dan et al., "Accurate Unlexicalized Parsing", Proceedings of the 41st Annual Meeting on Association for Computational Linguistics, 2003, pp. 423-430, vol. 1.

Delgado, Diogo et al., "Automated Illustration of News Stories", IEEE Fourth International Conference on Semantic Computing, 2010, pp. 73-78.

Zitnick, C. Lawrence et al., "Bringing Semantics Into Focus Using Visual Abstraction", Computer Vision and Pattern Recognition (CVPR), 2013, pp. 3009-3016, IEEE.

Goldberg, Andrew B. et al., "Easy as ABC? Facilitating Pictorial Communication via Semantically Enhanced Layout", Proceedings of the 12th Conference on Computational Natural Language Learning, 2008, pp. 119-126.

Chang, Angel X. et al., "Learning Spatial Knowledge for Text to 3D Scene Generation", EMNLP, 2014, 11 pages.

Barnard, Kobus et al., "Matching Words and Pictures", Journal of Machine Learning Research, 2003, pp. 1107-1135, vol. 3.

Aletras, Nikolaos et al., "Representing Topics Using Images", Proceedings of NAACL-HLT, 2013, pp. 158-167.

Gobron, Stephane et al., "From Sentence to Emotion: A Real-Time Three-Dimensional Graphics Metaphor of Emotions Extracted From Text", The Visual Computer, 2010, pp. 505-519, vol. 26.

Manning, Christopher D. et al., "The Stanford CoreNLP Natural Language Processing Toolkit", Proceedings of 52nd Annual Meeting of the Association for Computational Linguistics: System Demonstrations, 2014, pp. 55-60.

Zhu, Xiaojin et al., "A Text-to-Picture Synthesis System for Augmenting Communication", Association for the Advancement of Artificial Intelligence, 2007, 6 pgs.

Schwartz, Katharina et al., "Text-to-Video: Story Illustration from Online Photo Collections", Knowledge-Based and Intelligent Information and Engineering Systems, 2010, pp. 402-409, Springer.

Recasens, Marta et al., "The Life and Death of Discourse Entities: Identifying Singleton Mentions", Proceedings of NAACL-HLT, 2013, pp. 627-633.

Joshi, Dhiraj et al., "The Story Picturing Engine—A System for Automatic Text Illustration", ACM Transactions on Multimedia Computing, Communications and Applications, Feb. 2006, pp. 1-22, vol. 2, No. 1.

Mihalcea, Rada et al., "Toward Communicating Simple Sentences Using Pictorial Representations", Machine Translation, 2008, 22(3): 153-173.

Goldberg, Andrew B. et al., "Toward Text-to-Picture Synthesis", NIPS 2009 Mini-Symposia on Assistive Machine Learning for People with Disabilities, 2009, 3 pages.

* cited by examiner

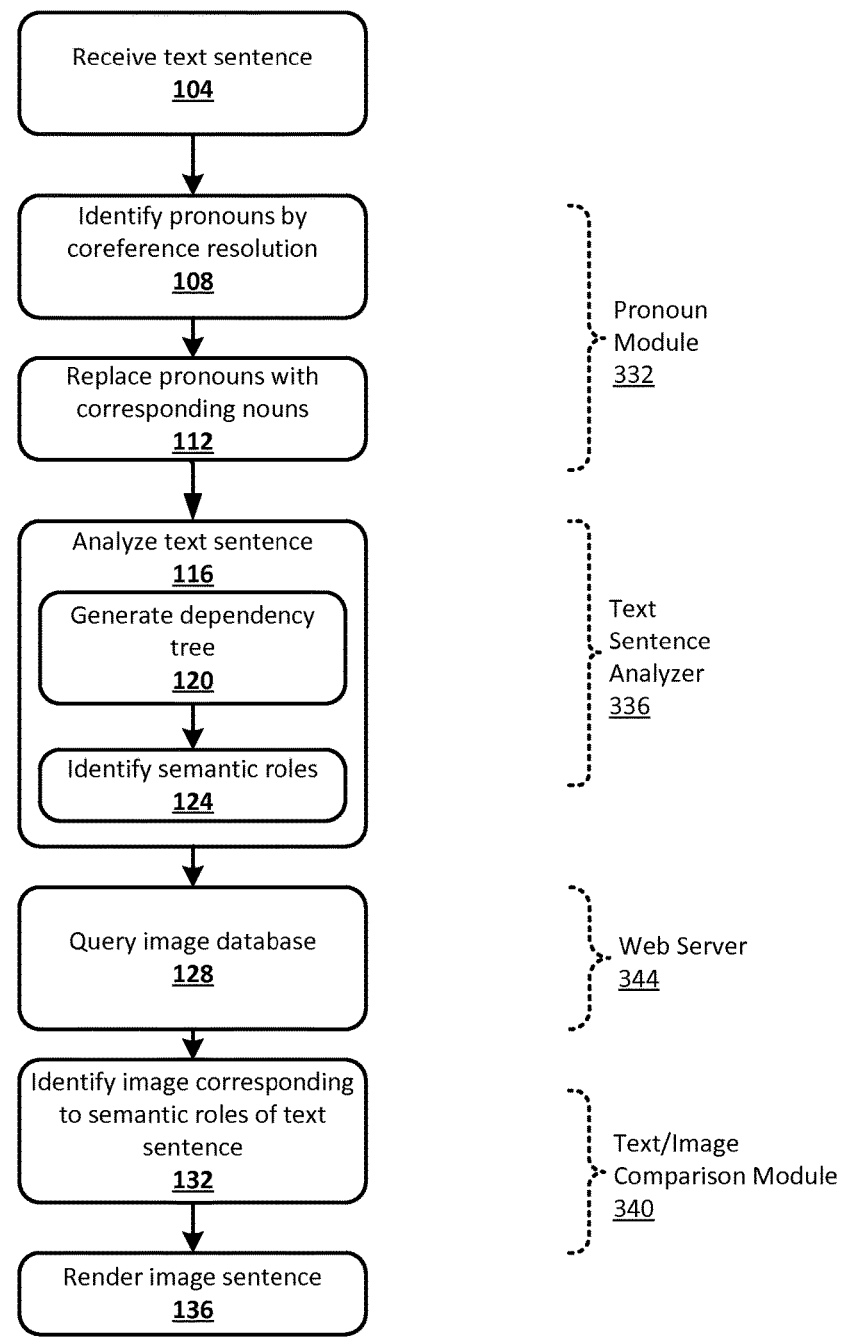

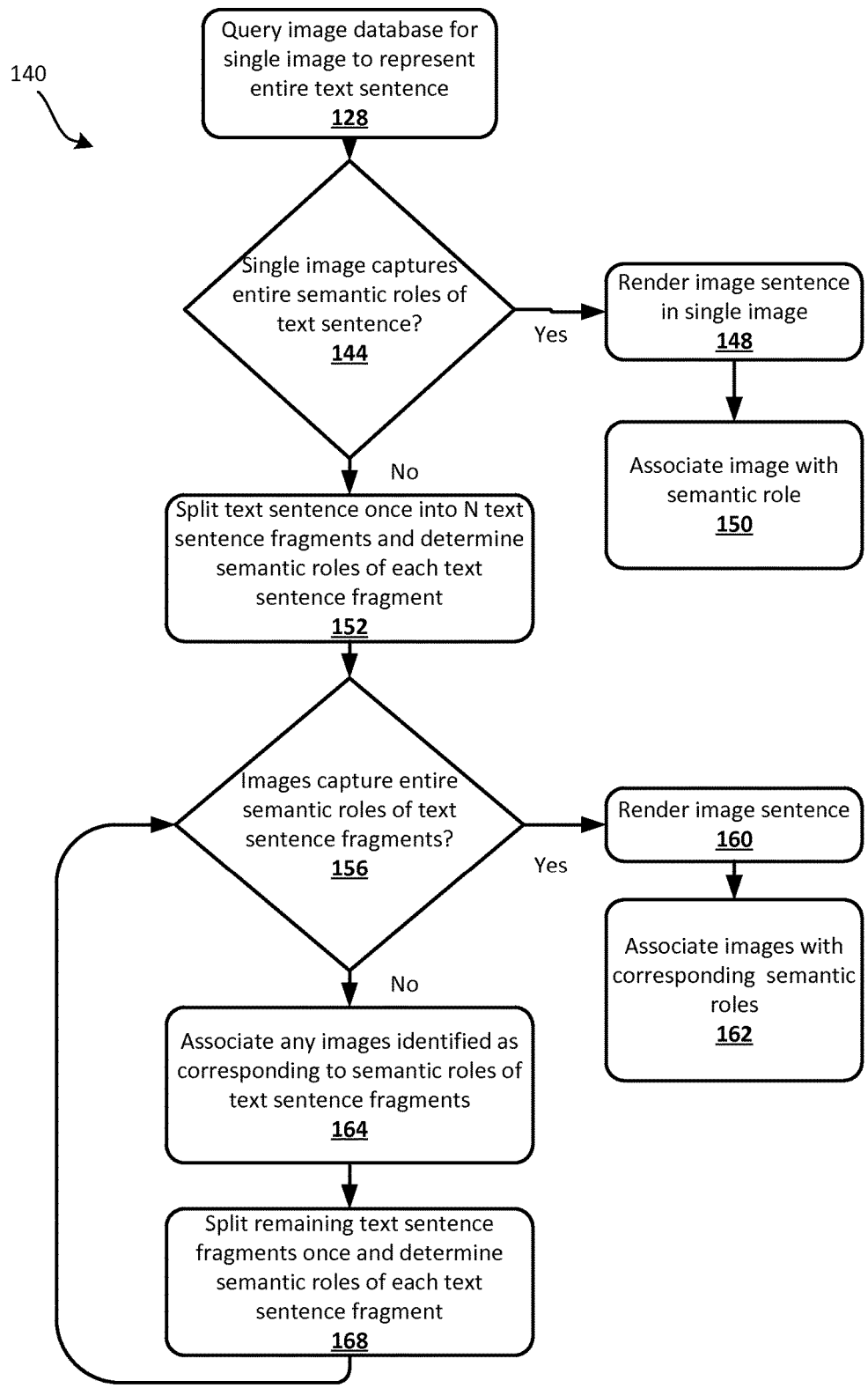

CONVERTING A TEXT SENTENCE TO A SERIES OF IMAGES

TECHNICAL FIELD

The present disclosure relates generally to generating an image-based representation of a text sentence. Specifically, the present disclosure is directed to representing a text sentence as one or more images, in which each semantic role of the text sentence is represented by the one or more images.

BACKGROUND

One or more images can be used to visually communicate concepts in a text sentence. Graphical representation of a text sentence can be applied in any of a variety of contexts. For example, using images rather than text facilitates communication across language barriers. Communicating to children usually benefits from the addition of images, particularly pre-literate children. In short, using images improves the communication effectiveness of text, whether to communicate an idea to those unable to read a particular language, sustain interest of a reader, or improve comprehension and recollection. Adobe Voice is an application that allows text to be complimented by images. In particular, this application allows a user to manually choose images from a large repository, to complement a narrative provided by the user. However, available techniques do not automatically extract the content of words, phrases, or sentences and select images from a set of images to represent or symbolize that content, as provided herein.

BRIEF DESCRIPTION OF THE DRAWINGS

FIG. 1A is a flow diagram depicting a method for converting a text sentence to an image sentence that the semantic roles of the text sentence, in accordance with an embodiment of the present disclosure.

FIG. 1B illustrates a method for recursively breaking a text sentence into text sentence fragments which are used to generate an image sentence, in accordance with an embodiment of the present disclosure.

Figure 2A:
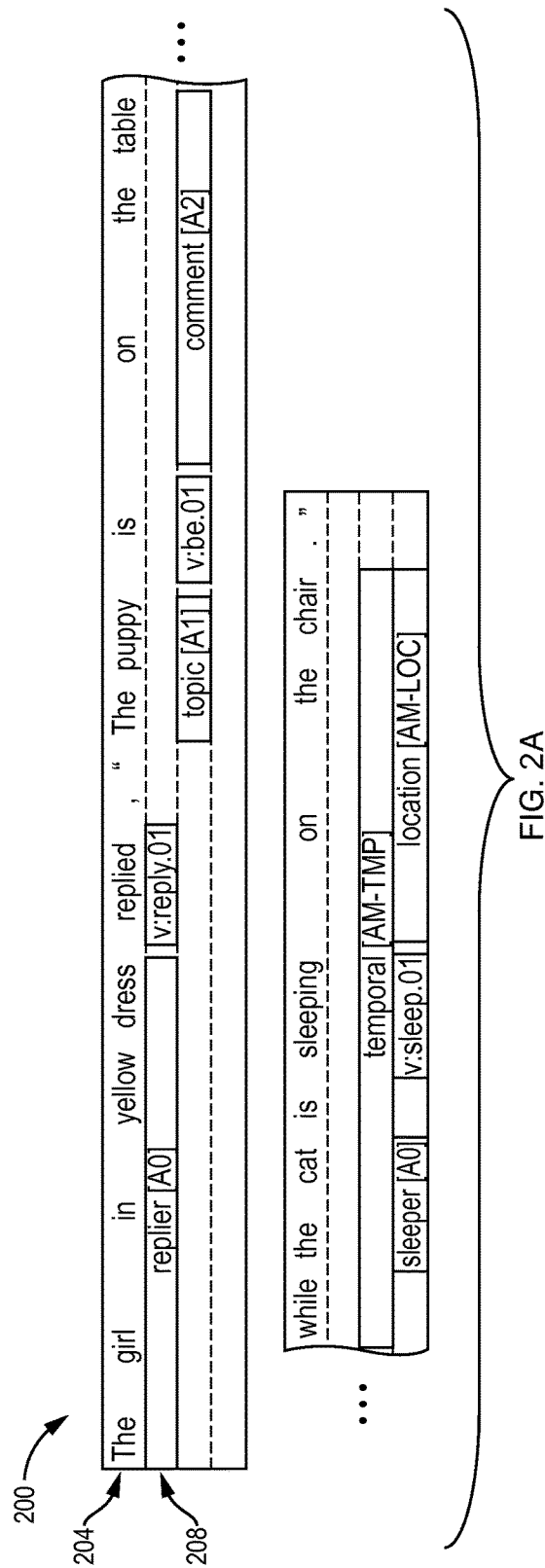
FIG. 2A is a diagram graphically illustrating semantic role labeling of a sentence, in accordance with an embodiment of the present disclosure.

The figures depict various embodiments of the present disclosure for purposes of illustration only. Numerous variations, configurations, and other embodiments will be apparent from the following detailed discussion.

DETAILED DESCRIPTION

As previously noted, available techniques do not automatically extract the content of words, phrases, or sentences and select images from a set of images to represent or symbolize that content. Whether a series of images can be effectively substituted for a text sentence is largely a function of the semantic similarity between the text sentence and the images substituted for the text. The difficulty of communicating a text sentence using images becomes more significant as the complexity of the text increases for at least two reasons. First, because multiple concepts are often communicated in a single text sentence, a corresponding "image sentence" usually employs multiple images. As explained herein, an image sentence generally refers to a sentence conveyed with one or more images. In some cases presenting a reader with too many images (e.g., one image for every noun, pronoun, adjective, verb, and adverb can be confusing. Second, using too few images can also be confusing because important concepts may be omitted from an image-based representation of the text sentence. Tools facilitating the conversion of a text sentence to a number of images while still representing each semantic role in the text sentence would be helpful.

Thus, and in accordance with an embodiment of the present disclosure, techniques are provided for converting a text sentence to a series of images to form an image sentence. As used herein, a text sentence is implemented with words and does not include images. Note that source of the text sentence may vary. For instance, a given text sentence be spoken and then converted to text, or typed using a text editor, or extracted from an image using optical character recognition, to name a few example such text sentence sources. A sentence fragment of a text sentence is a contiguous subset of words within the text sentence corresponding to at least one of: (1) a verb; and (2) an adjunct or adjunct phrase associated with a verb. In any such cases, a given text sentence can be automatically converted to an image sentence. A "verb phrase" is composed of at least one verb and optionally includes corresponding dependents such as objects, complements, and other modifiers. A subject of a verb action may be included in the verb phrase, but this is not required.

In accordance with one example embodiment, an image sentence is automatically generated from a given text sentence, and includes one or more images presented to communicate semantic roles identified in a corresponding text sentence. Note that identifying semantic roles, sometimes called "semantic role labelling" or "shallow semantic parsing," is an established natural language processing task, and generally refers to the detection of the semantic arguments associated with the predicate or verb of a sentence and classification of those semantic arguments into their specific roles. At a high level, a semantic role is one of an action performed by a verb, a relationship between a verb and an actor performing the action of the verb, and a relationship between a recipient receiving the action of the verb that is performed. The actor and the recipient are types of "adjuncts" of the verb. An adjunct is a phrase of one or more words in a text sentence that is related to a verb as described above. Types of adjuncts include relational (describing an actor or a recipient of the action of the verb), locational (describing the relative location, absolute location, or position in which the action of the verb has taken place), temporal (describing the relative or absolute timing in which the action of the verb has taken place, the duration of the action, or the frequency of the action), and manner (describing the qualities of how the action of the verb has taken place). For example, consider the following example sentence: "The girl caught the ball." The semantic role of the word "caught" is that of a verb that describes an action that is performed. Once the verb in a given text sentence is identified, semantic roles of adjuncts associated with that verb can be identified. For example, the semantic role of "girl" is that of an actor performing the action of the verb "caught." Analogously, the semantic role of "ball" is that of a recipient receiving the action of the verb "caught" that is performed by the actor "girl." Note that the sentence can be considered as two sentence fragments, each fragment including a verb and an adjunct. Specifically, the first sentence fragment is "The girl caught" (adjunct+verb), and the second sentence fragment is "caught the ball" (verb+adjunct). Similarly, the sentence can be considered as three sentence fragments: "The girl" and "caught" and "the ball."

So, according to an embodiment, an image sentence can be generated from a text sentence by first identifying verbs in the text sentence and then identifying the adjuncts in the text sentence. Once these semantic roles (verbs and adjuncts) of a sentence are identified, an image database is automatically queried for images associated with information corresponding to the identified semantic roles. In this embodiment, unless a single image is found to depict every semantic role identified in the text sentence, the text sentence is recursively split into smaller text sentence fragments and the process if repeated. For example, if no single image represents the sentence "The girl caught the ball" (because there is no image showing a girl catching a ball), then the sentence would be split into two sentence fragments "The girl caught" and "caught the ball" for a second round of processing. The image database is again queried for images associated with information corresponding to the semantic roles of each sentence fragment. In this particular example case, the identified images might include, for instance, a first image of a girl with her arms extended about to catch something, and a second image of extended arms (perhaps divorced from remainder of a body) catching a ball. As previously noted, this process can be performed recursively until images have been identified that describe each sentence fragment for a given processing cycle. For example, if the two images such as those noted above (girl with her arms extended about to catch something, and extended arms catching a ball) cannot be found, then the two fragments could be further split into three fragments: "the girl," "caught," and "the ball." In this particular third cycle of the example process, the identified images might include, for instance, an image of a girl, an image of something being caught, and an image of a ball. Eventually, depending on the database being queried, an image can be found for each sentence fragment. If no relevant image is found for a given segment, a question mark image can be presented, or some other default image.

One benefit of the techniques provided herein, according to some embodiments, is that, because the foregoing method is performed recursively in light of the identified semantic roles of a text sentence, the number of images used to represent the text sentence is minimized or otherwise reduced. That is, unlike systems that do not consider semantic meaning, and thus might either include too few images to graphically convey all semantic roles of a text sentence or always include too many images (e.g., one image for each and every noun, pronoun, adjective, verb, and adverb in a sentence each and every time), image sentences generated according to some embodiments of the present disclosure recursively split a text sentence into smaller and smaller sentence fragments. At each recursive splitting of a sentence, the semantic roles of selected images are compared to each semantic role of the text sentence fragments to determine whether any more images are required to communicate all of the semantic roles identified in the text sentence. In this way, a minimum number of images can be identified to fully represent the given text sentence as an image sentence. Note, however, that a true "minimum" is not required and some embodiments may identify a number of images that is less than an image for every individual verb and adjunct of the given text sentence.

Another benefit of the techniques provided herein, according to some embodiments, is the automatic selection of relevant images to accompany given text. Such automatic selection frees the user from having to engage in a time-consuming and tedious manual selection of images, and further allows for parsing of a much larger database that would not be consumable by a human, given practical limitations. Moreover, the selection of images based on verbs and/or adjuncts is not necessarily a trivial endeavor, especially for those who are not particularly skilled in grammar and sentence structure. Moreover, while having the images automatically presented to represent textual components of a sentence is very helpful to readers (especially when the images are presented to the reader with the sentence), requiring a reader to first review the sentence without the benefit of the images and then attempt to think of relevant images in advance of actually seeing those images is quite different and more challenging as doing so involves a degree of creativity and acquired knowledge.

Another benefit of the techniques provided herein, according to some embodiments, is the automatic conversion of any given text-based document to a image-based document. As will be appreciated in light of this disclosure, all text of a given document can be replaced or supplemented with images. For example, upon analyzing a presentation, an article, or text associated with electronic media (e.g., a website, a mobile application), one such embodiment of the present disclosure can be programmed or otherwise configured to identify images relevant to the text that will improve comprehension of the text. Another benefit of the techniques provided herein, according to some embodiments, is the consistent selection of a same image to correspond to a same text word. This uniform application of an image to a text word can be applied to, for example, all queries to a particular image database, to a given user, a session associated with a user, a multi-text sentence article of content, and a single sentence, to name a few example scenarios. Providing a same image to all occurrences of a word improves clarity of an image sentence and comprehension on the part of the reader.

Converting a Text Sentence to an Image Sentence

As mentioned above, embodiments of the present disclosure recursively identify semantic roles of one or more of verbs in a text sentence and, in some embodiments, the semantic roles of adjuncts corresponding to the one or more verbs. Based on the semantic role of the identified verb, an image database is queried for one or more images corresponding to the one or more verbs and/or associated adjuncts.

FIG. 1A illustrates an example method 100 for converting a text sentence to an image sentence that communicates semantic roles of the text sentence, in an embodiment. The method 100 begins, in this embodiment, by receiving 104 a text sentence for conversion to an image sentence. For the received 104 sentence, pronouns in the text sentence are identified 108 using a process known as coreference resolution. Once identified 108 using coreference resolution, each pronoun is replaced 112 with a corresponding noun. For an illustration of the coreference resolution process, consider the sentence "the ball was thrown to the girl, and she caught it." After applying coreference resolution, this sentence is converted to "the ball was thrown to the girl, and the girl caught the ball."

A benefit of replacing 112 pronouns with their corresponding nouns is an improvement in the operation of subsequent steps of the method 100. For example, upon replacing 112 each pronoun with a corresponding noun, the method 100 is better able to analyze a sentence and subsequently generate a corresponding image sentence, as will be described below in more detail. One example of an algorithm used for applying co-reference resolution to a text sentence is the Stanford Deterministic Coreference Resolution System, although other algorithms for coreference resolution may also be used.

Once the pronouns have been replaced 112 with corresponding nouns, the text sentence is analyzed 116. The analysis 116 of the text sentence has two elements: generating 120 a dependency tree and identifying 124 semantic roles. The first element of the analysis 116 includes generating 120 a dependency tree of a text sentence. The generated 120 dependency tree identifies the grammatical functions of words in the text sentence, and also identifies syntactic relationships between the words. While the term "tree" suggests a graphical representation of these relationships, the relationships may also be identified and recorded using any convenient means. These identified grammatical functions and syntactic relationships are used in the second part of the analysis 116, described below. A graphical representation of a dependency tree is shown in FIG. 3B for convenience of explanation and is described below in more detail. In one example, the dependency tree is generated 120 using the Stanford unlexicalized probabilistic context-free grammar (PCFG) parser, which operates to tag grammatical components of a sentence, such as verbs and adjuncts. Other suitable grammatical parsing algorithms and semantic role identification algorithms are also applicable here. In a more general sense, any suitable probabilistic parsers for natural language text can be used to identify verbs and adjuncts of a given sentence, and the present disclosure is not intended to be limited to any particular parser. As will be appreciated in light of this disclosure, once tagged or otherwise identified by the natural language sentence parser, the various sentence fragments can then be presented to an image database via a query to identify corresponding images.

As part of generating 120 the dependency tree, verbs and corresponding adjunct phrases within a text sentence are identified. As described above, an adjunct phrase is a phrase associated with a verb that describes one of an "actor" performing the action associated with the verb, a "recipient" receiving the action associated with the verb, and an "instrument" used to perform the action of the verb.

Identifying the verbs and their corresponding adjunct phrases facilitates identification 124 of semantic roles within the text sentence. Some other methods that might be used to associate images with a text sentence ignore the semantic roles of these adjuncts when selecting images for the text sentence. As a result, the image sentences produced using these methods would lack information present in the text sentence and may not accurately convey the meaning of the text sentence.

The analysis 116 of the method 100 continues by identifying 124 semantic roles of the various verbs and associated adjuncts, again using the Stanford PCFG Parser (see, for example: Klein, Dan, and Christopher D. Manning "Accurate unlexicalized parsing," Proceedings of the 41st Annual Meeting on Association for Computational Linguistics-Volume 1. Association for Computational Linguistics, 2003).

Having identified 124 the semantic roles of the verbs and corresponding adjuncts of the text sentence, the method 100 continues by querying 128 an image database for a single image. In one embodiment, the query compares the semantic roles identified 124 to tags associated with the images in the image database. The querying 128 may include optional features that improve the query. For example, synonyms for text words and alternative semantic roles of a text sentence are optionally determined using an Enhanced Lesk Word Sense Disambiguation Algorithm according to Basile et al. (see, for example: Basile, Pierpaolo, et al. "UNIBA: JIGSAW algorithm for word sense disambiguation." Proceedings of the 4th International Workshop on Semantic Evaluations. Association for Computational Linguistics, 2007) and a semantic analysis system, such as BabelNet. Disambiguation algorithms attempt to computationally determine a contextually proper meaning of a particular word when the word has multiple meanings. Identifying a contextually proper meaning of a word is beneficial for improving the semantic similarity between a text sentence and an image sentence. Alternative querying 128 includes synonyms and other semantic roles of the text sentence identified using these methods.

In other embodiments, to improve the relevance of the images and the computational efficiency of the query 128, numbers and dates of the text sentence are not queried but rather are presented in the image sentence in a semantically appropriate location relative to the identified images. In another embodiment, named entities are not split in the recursive analysis described below in the context of FIG. 1B. Rather, named individuals, geographic or political features, and other proper nouns (e.g., the Statue of Liberty) maintain their integrity as a named entity.

In some embodiments, an image is identified 132 corresponding to the semantic roles of the text sentence. In a first step, the query seeks to match each of the identified 124 semantic roles of the text sentence with a single image. In another embodiment, images identified 132 initially are further analyzed to select the most appropriate image for the text fragment. For example the identified 132 images are analyzed using a graph-based algorithm. Feature vectors are then identified from the various segments identified in the graph-based analysis. In this example, color features, shape features, and texture features are extracted from the subset of candidate images. A Quadratic-Chi histogram distance is used to measure dissimilarities between histograms of the various feature vectors. A CLUES algorithm, as described by Wang et al. (see, for example: Xiaogang Wang, Weiliang Qiu, and Ruben H Zamar. 2007. Clues: A non-parametric clustering method based on local shrinking Computational Statistics & Data Analysis, 52(1):286-298) is used for analyzing non-parametric clustering of various segments. The candidate images having a densest cluster of segments are identified as the most relevant to the query. The mean of the densest cluster of segments is determined. The images selected as most representative of the text are those having a histogram having a Chi-squared distance closest to the determined mean.

Candidate images are further identified 132 for suitability with respect to the corresponding semantic role of the text sentence using, for example, a trained database of image descriptions, as described by Karpathy et al. (See, for example: Karpathy, Andrej, and Li Fei-Fei. "Deep visual-semantic alignments for generating image descriptions." arXiv preprint arXiv:1412.2306 (2014)). A benefit of using a trained database such as the one described by Karpathy is the improved accuracy that comes from using an empirically trained database of images to identify semantic roles of images. The semantic roles associated with the candidate images are compared for accuracy to the trained database using a "Word2vec" algorithm provided by GOOGLE®. If the candidate image is similar to the semantic role of the verb, an adjunct, or combinations thereof, as indicated by a similarity score, the candidate image is selected to represent the semantic role of the verb, adjunct, or combination thereof. Once all semantic roles of the text sentence are represented by an image, the image sentence is rendered 136.

Most text sentence are communicated with more than a single image and, as will be explained in more detail in the context of FIG. 1B, the method includes a recursive analysis that divides the text sentence into successively smaller sentence fragments until all of the semantic roles of a text sentence are represented by an image.

Recursive Conversion of a Text Sentence into an Image Sentence

As mentioned above, one advantage of some embodiments of the present disclosure is the generation of image sentences that represent semantic roles within a corresponding text sentence while minimizing the number of images used in the image sentence. This is accomplished using a recursive semantic analysis, an embodiment of which is illustrated in FIG. 1B.

The method 140 of FIG. 1B provides further detail to the method 100 of FIG. 1A regarding the recursive analysis described above. The method 140 is shown as first querying 128 the image database for a single image to represent the semantic roles of the text sentence. To avoid unnecessary duplication with FIG. 1A, elements illustrating coreference resolution and analysis of a text sentence are omitted from the depiction of the method 140 even though these precede the query 128. As described above in the method 100, the text in the current text fragment is compared to tags (or other associated information) describing the content of images stored in the text database. In response to the query 128, the method 140 determines 144, based on the tags of the images, whether a single image in the database captures all semantic roles identified in the text sentence. If a single image is determined 144 to capture all of the semantic roles identified in the text sentence, then the text sentence is rendered 148 as an image sentence having a single image.

The identified image is then associated 150 with the semantic roles of the text sentence. This improves viewer comprehension and computational efficiency by reproducing a same image for the same semantic roles. An image is associated with a semantic role for at least one of a user, a domain, or an image database.

If no single image is determined 144 to capture all of the semantic roles of the text sentence, then the text sentence is split 152 into a number of text sentence fragments. The number of text sentence fragments is determined based on the number of verbs in the text sentence. For example, to facilitate semantic role analysis, the text sentence is split into a number of text sentence fragments, each of which can correspond to a verb in the text sentence. Having split the text sentence into a number of fragments, the semantic role of each of the text sentence fragments is determined 152. As mentioned above, this determination 152 is not based solely on the verb, but also the verb adjuncts. In one example, the semantic role is determined with respect to the verb and is associated actor adjuncts. Referring again to the example mentioned above of "the ball was thrown to the girl, and the girl caught the ball," two sentence fragments are generated: one fragment relating to the verb "thrown" (i.e., "the ball was thrown to the girl") and one fragment relating to the verb "caught" (i.e., "the girl caught the ball.").

The image database is queried and determines 156 whether the semantic role of each text sentence fragment is captured by one image corresponding to each fragment. If so, then the image sentence is rendered 160 using a series of images, each image of the series corresponding to the semantic role of a corresponding text sentence fragment. These identified images are then stored as associated 162 with the semantic role(s). This association enables the same image to be reused for the same corresponding semantic role in a subsequent text sentence analysis.

The method 140 continues as a recursive analysis if even a single text sentence fragment is not represented by a corresponding image. For any text sentence fragments that are represented by an image, the images are associated 164 with the semantic role as in step 162 to facilitate communication and computational efficiency. For unrepresented text sentence fragments, the fragments are split into smaller fragments that are identified with the verb of the fragment as well as the roles of the adjuncts associated with the verb. That is, for each verb in the sentence fragment, the actors, recipients (sometimes referred to as "patients" in the literature), and instruments are identified along with the causation, location, and direction adjuncts modifying the verb, all of which are then used to query the image database for an image associated with tags that correspond to the same or similar semantics of the sentence fragment. This process is repeated recursively until each semantic role in the original sentence is represented by an image. As mentioned above, a benefit of this recursive process is that the number of images depicting a text sentence is minimized while still depicting each semantic role present in the text sentence.

To facilitate explanation of the recursive aspect of the method, consider the example presented above of "the ball was thrown to the girl, and the girl caught the ball." Assuming that no single image in a database of tagged images is found to represent both of the semantics in this sentence, the analysis would split the sentence into, in this example, two sentence fragments: (1) "the ball was thrown to the girl"; and "the girl caught the ball." Having generated these two sentence fragments based on the verbs, the image database is queried for images having tags corresponding to the "the ball was thrown to the girl" and "the girl caught the ball."

Illustrative Example

Figure 2B:
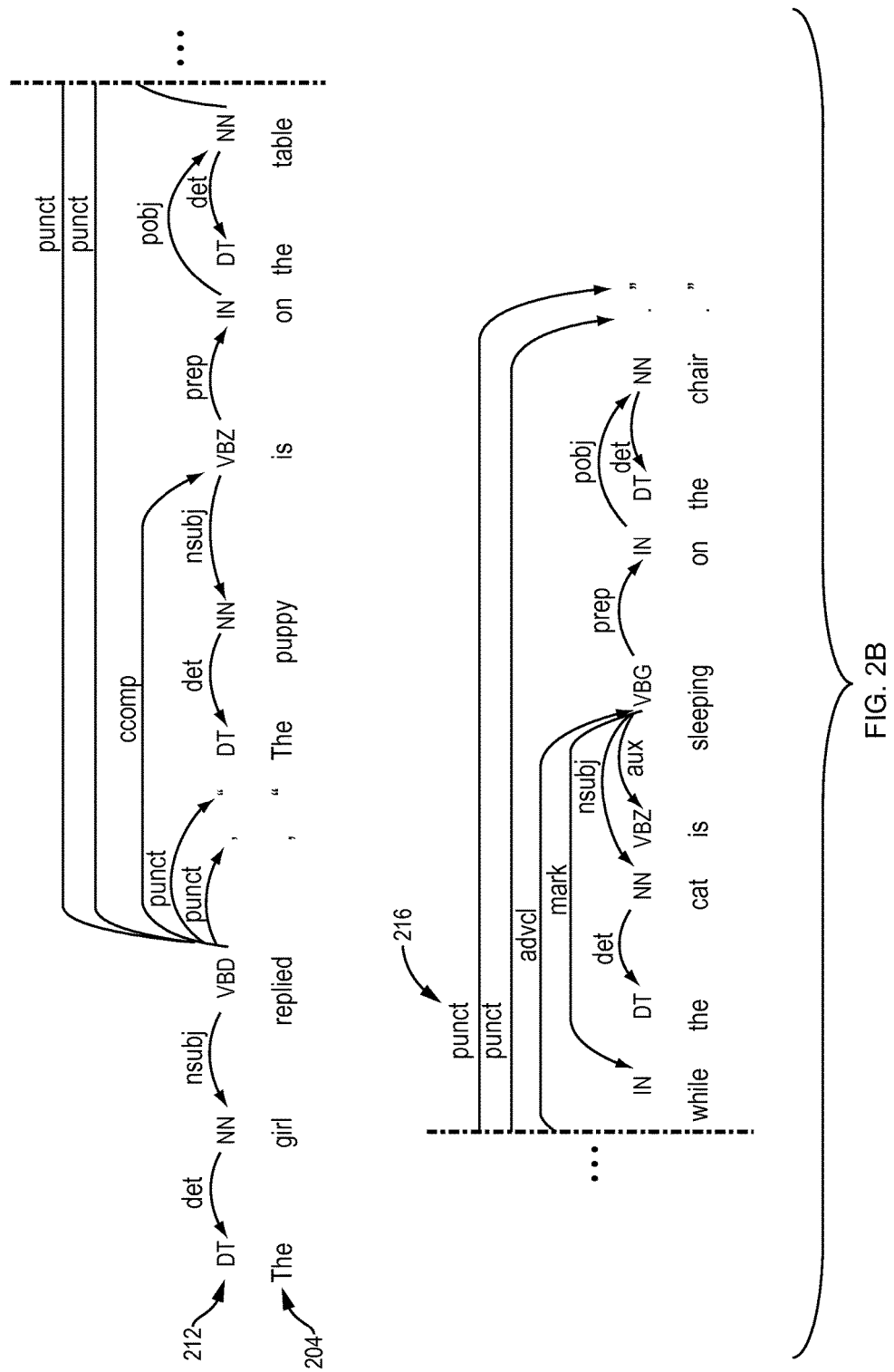
FIG. 2B is a diagram illustrating labels identifying parts of speech and grammatical functions in an example sentence, in accordance with an embodiment of the present disclosure.
Figure 2C:
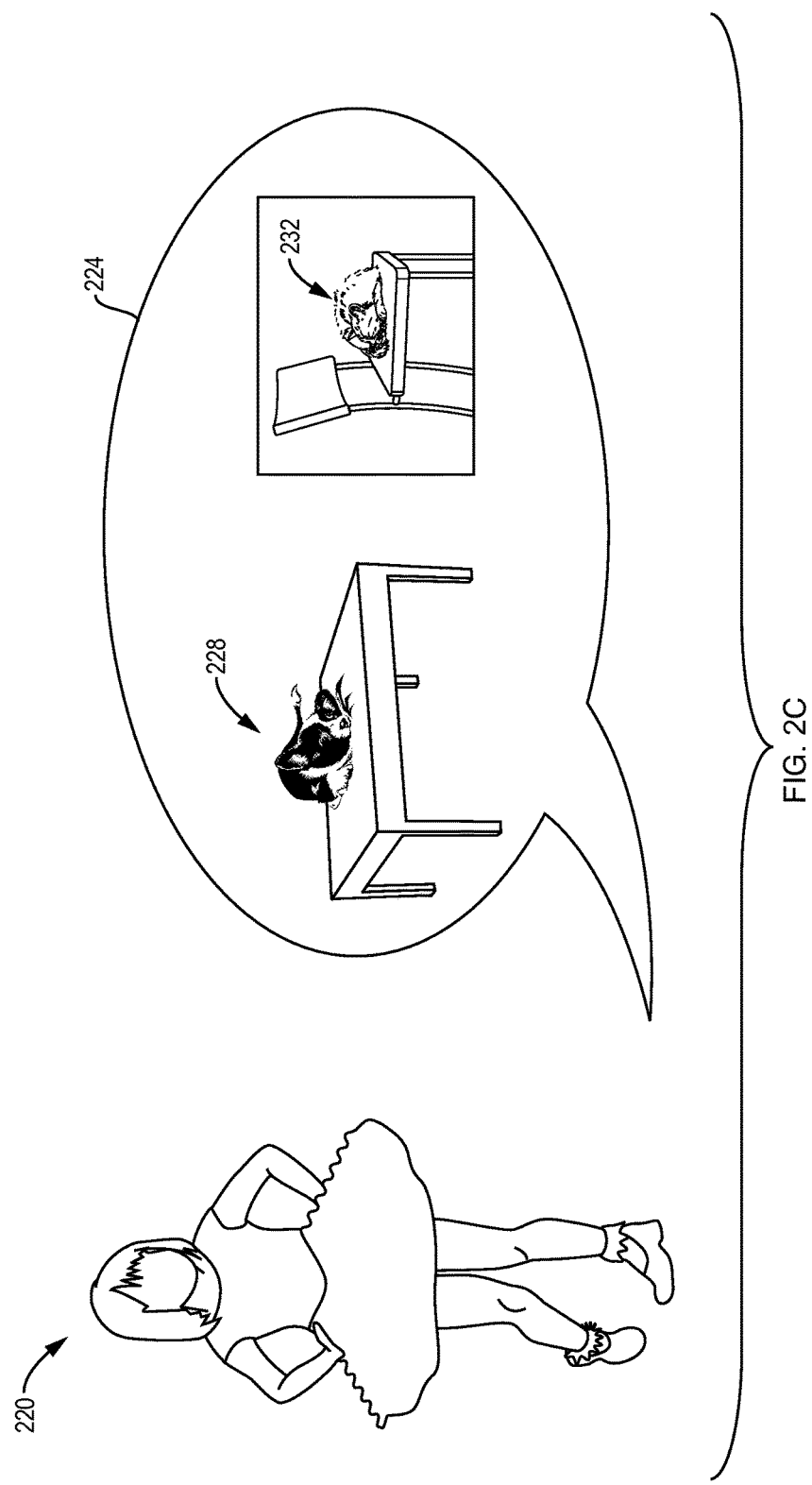
FIG. 2C is a depiction of an image sentence depicting all semantic roles present in a text sentence, in accordance with an embodiment of the present disclosure.

FIGS. 2A-2C graphically depict various elements of the methods 100 and 140 presented above in FIGS. 1A and 1B. These depictions are presented solely for clarity of explanation. In this example, the following text sentence is received for conversion to an image sentence: "The girl in the yellow dress replied, 'The puppy is on the table while the cat is sleeping on the chair."

FIG. 2A is a graphical depiction 200 of semantic role labeling of the example text sentence, in an embodiment. The example sentence 204 is presented in the graphical depiction 200. Below the example sentence 204 are the semantic roles 208 associated with the various elements of the example sentence 204. For example, based on identification of "replied" as a first verb of the sentence, the preceding clause ("The girl in the yellow dress") is identified as the "replier" of the sentence. This actor adjunct is annotated as "A0" using standard nomenclature. Similar functions are identified throughout the sentence and are provided merely as a visual depiction of semantic role labeling.

FIG. 2B is a diagram illustrating labels applied to words in an example sentence identifying parts of speech and grammatical function, in an embodiment of the present disclosure. For example, annotations in row 212 refer to the part of speech corresponding to each word. The annotations use standard terminology, including for example, "DT" indicating a determiner, "NN" indicating a singular noun, "VBD" indicating a past tense verb, "VBZ" indicating a third person singular present verb and "IN" indicating a preposition, among others. The rows above 212 collectively identified as 216 identify grammatical functions and dependency relationships between elements of the example sentence 204. For example, "det" identifies a determiner, "nsubj" indicates a noun subject. Other relationships identified using these standard annotations include prepositions, adjectives, and punctuation marks, among others.

The analysis and labeling performed in various steps of the methods 100 and 140, and as depicted for convenience of explanation in FIGS. 2A and 2B are used to identify semantic roles, identify parts of speech of various words based on their syntactic functions in the sentence, and identify dependency relationships within the sentence to better identify and analyze the various semantic roles of the sentence.

FIG. 2C is a depiction of the example text sentence 204 converted to an image sentence 218 using some of the embodiments of the present disclosure. The image sentence 218 includes a number of images that communicates all semantic roles present in the example text sentence 204. In the example text sentence 204, "the girl in the yellow dress" is shown accordingly as image 220. Speech bubble 224 corresponds to the verb "replied" of the clause "the girl in the yellow dress replied." Within the speech bubble 224 is the subject of the reply, namely image 228 showing a puppy on a table and image 232 showing a cat sleeping on a chair.

While the above example is presented in terms of an isolated text sentence, this is only for convenience of explanation. In other applications of the embodiments described herein, text from a presentation may be analyzed to identify and select images to accompany the presentation text. This has the benefit of omitting tedious, time consuming, and often unsuccessful selection of an image to present on a presentation slide to facilitate viewer comprehension. In another application, embodiment of the present disclosure can be applied in conjunction with speech to text applications, thereby facilitating the user of speech to text applications in a variety of contexts.

Example Environment and System

Figure 3A:
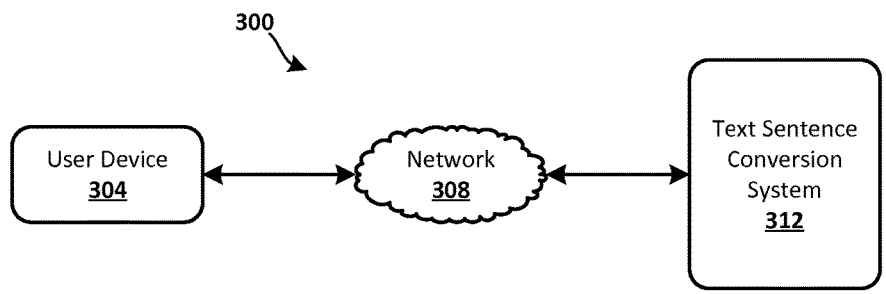
FIG. 3A is a block diagram of a distributed processing environment that includes a text sentence conversion system remotely coupled to a computing device of a given user by a communication network, in accordance with an embodiment of the present disclosure.
Figure 3B:
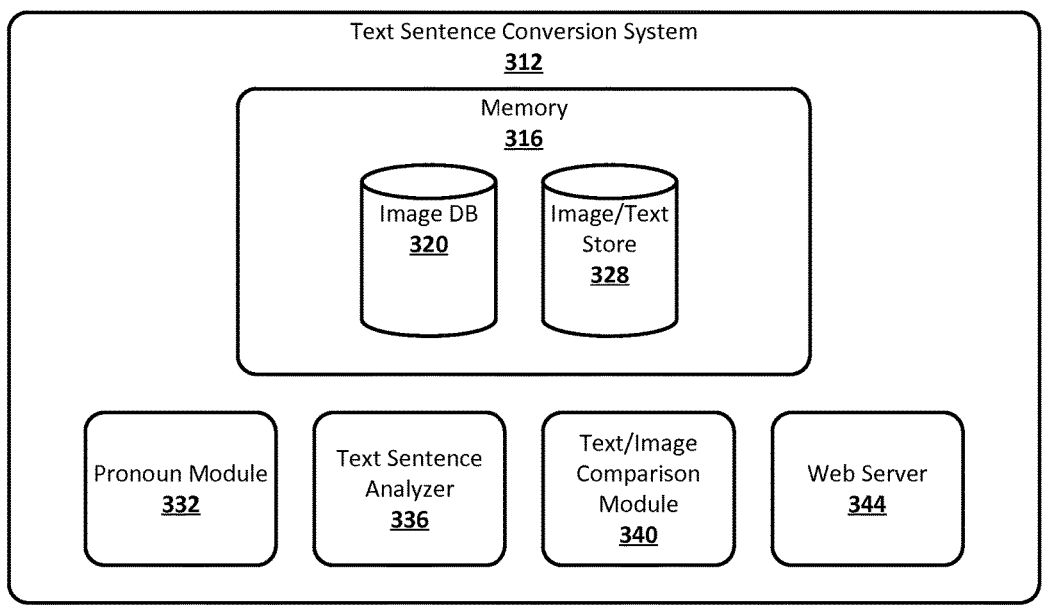
FIG. 3B is a block diagram depicting a system for converting a text sentence to an image sentence that communicates the semantic roles of the text sentence, in accordance with an embodiment of the present disclosure.

FIG. 3A is an example environment 300 in which a system for converting a text sentence to a number of images may operate, in an embodiment of the present disclosure. The system environment 300 shown in FIG. 3A includes a user device 304, a network 308, and a text sentence conversion system 312. In other embodiments, the system environment 300 includes different and/or additional components than those shown in FIG. 3A.

The user device 304 is a computing device capable of receiving user input as well as transmitting and/or receiving data via the network 308. In one embodiment, the user device 304 is a computer system, such as a desktop or laptop computer. In another embodiment, the user device 304 may be a device having computer functionality, such as a personal digital assistant (PDA), mobile telephone, tablet computer, smartphone or similar device. In some embodiments, the user device 304 is a mobile computing device used for recording video content by a first user and an analogous mobile computing user device is used for viewing video content. The user device 304 is configured to communicate with the text sentence conversion system 312 via the network 308. In one embodiment, the user device 304 executes an application allowing a user of the user device 304 to interact with the text sentence conversion system 312, thus becoming a specialized computing machine. For example, the user device 304 executes a browser application to enable interaction between the user device 304 and the text sentence conversion system 312 via the network 308. In another embodiment, a user device 304 interacts with the text sentence conversion system 312 through an application programming interface (API) that runs on the native operating system of the user device 304, such as IOS® or ANDROID™

The user device 304 is configured to communicate via the network 308, which may comprise any combination of local area and/or wide area networks, using both wired and wireless communication systems. In one embodiment, the network 308 uses standard communications technologies and/or protocols. Thus, the network 308 may include links using technologies such as Ethernet, 802.11, worldwide interoperability for microwave access (WiMAX), 3G, 4G, CDMA, digital subscriber line (DSL), etc. Similarly, the networking protocols used on the network 308 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 308 may be represented using technologies and/or formats including hypertext markup language (HTML) or extensible markup language (XML). In addition, all or some of links can be encrypted using encryption technologies such as secure sockets layer (SSL), transport layer security (TLS), and Internet Protocol security (IPsec).

The text sentence conversion system 312, described below in the context of FIG. 3B in more detail, comprises one or more computing devices storing text sentences transmitted to the system by users via the network 108 and image sentences produced by the system corresponding to the text sentence.

The text sentence conversion system 312 is configured, upon receipt of a text sentence, to perform the some or all of the embodiments described above to convert the text sentence into an image sentence using a number of images that communicates each semantic role of the text sentence. In some embodiments, the text sentence conversion system 312 also includes functions that enable the sharing of image sentences generated in response to receiving a text sentence.

FIG. 3B is a block diagram of a system architecture of the text sentence conversion system 312 as shown in FIG. 3A. The text sentence conversion system 312 includes a memory 316, a pronoun module 332, a text sentence analyzer 336, a text/image comparison module 340, and a web server 344.

The memory 316 is depicted as including two distinct elements: an image database 320 and an image/text store 320. The image database 320 stores images and corresponding data (e.g., tags, captions, descriptions) that describe the semantic content of the image. By querying this databased, as described above, images corresponding to a semantic role of at least one of a text verb, verb phrase, adjunct, and sentence are identified.

The image/text store 328 stores in memory associations between a semantic role and a particular image. For example, once a specific image of a dog is identified as corresponding to the text word "dog," the same image will be used for all subsequent queries for an image of a dog. This has two benefits. First, it provides computational efficiency in that only a single image of a dog is stored and search for. Second, it improves clarity of communication for a user because the user will identify that specific image with the concept of a dog. The image/text store 328 and its associations can be associated with a user, a domain, or a particular image database.

The pronoun module 332 executes a process for identifying pronouns, identifying the nouns corresponding to the pronouns, and replacing the pronouns with the corresponding nouns, as described above.

The text sentence analyzer 336 analyzes the various grammatical and syntactic functions present in a text sentence, as described above. That is, the text sentence analyzer 336 generates a dependency tree that identifies the grammatical functions of words in the text sentence, and also identifies syntactic relationships between the words. The text sentence analyzer 336 is also configured to recursively analyze a sentence in coordination with the text/image comparison module 340. That is, upon receiving in indication from the text/image comparison module 340 that no single image captures all semantic roles identified in a text sentence, the text sentence analyzer 336 will generate sentence fragments as described above for subsequent analysis.

The text/image comparison module 340 receives text sentences and/or sentence fragments from the text sentence analyzer 336. Upon receiving a text sentence and/or sentence fragment, the text/image comparison module 340 determines a semantic role of the text sentence and/or sentence fragment and queries the image database 320 for an image associated with information indicating a semantic role similar to that of the sentence and/or sentence fragment. Upon identifying a candidate image, the text/image comparison module 340 compares the semantic role to information associated with image to the sentence and/or sentence fragment. Based on this comparison, the text/image comparison module 340 determines whether or not the sentence and image have similar semantic roles. If the roles are similar, the images are provided to the web server 344 for rendering to a user (e.g., on user device 304) as an image sentence. If the roles are not similar, an instruction is provided to the text sentence analyzer 336 to generate sentence fragments for subsequent querying for images.

The web server 344 links the text sentence conversion system 312 to the user device 304 via the network 308. The web server 344 serves web pages, as well as other web-related content, such as JAVA®, FLASH®, XML and so forth. The web server 344 may provide the functionality of receiving text sentences for conversion to image sentences from the user device 304, transmitting text sentence conversion results (i.e., an image sentence) to a user device, and executing various other communications between a user device and the text sentence conversion system 312. Additionally, the web server 344 may provide application programming interface (API) functionality to send data directly to native client device operating systems, such as IOS®, ANDROID™, WEBOS® or RIM. The web server 344 also provides API functionality for exchanging data with the user device 304.

Example Computing Device

Figure 4:
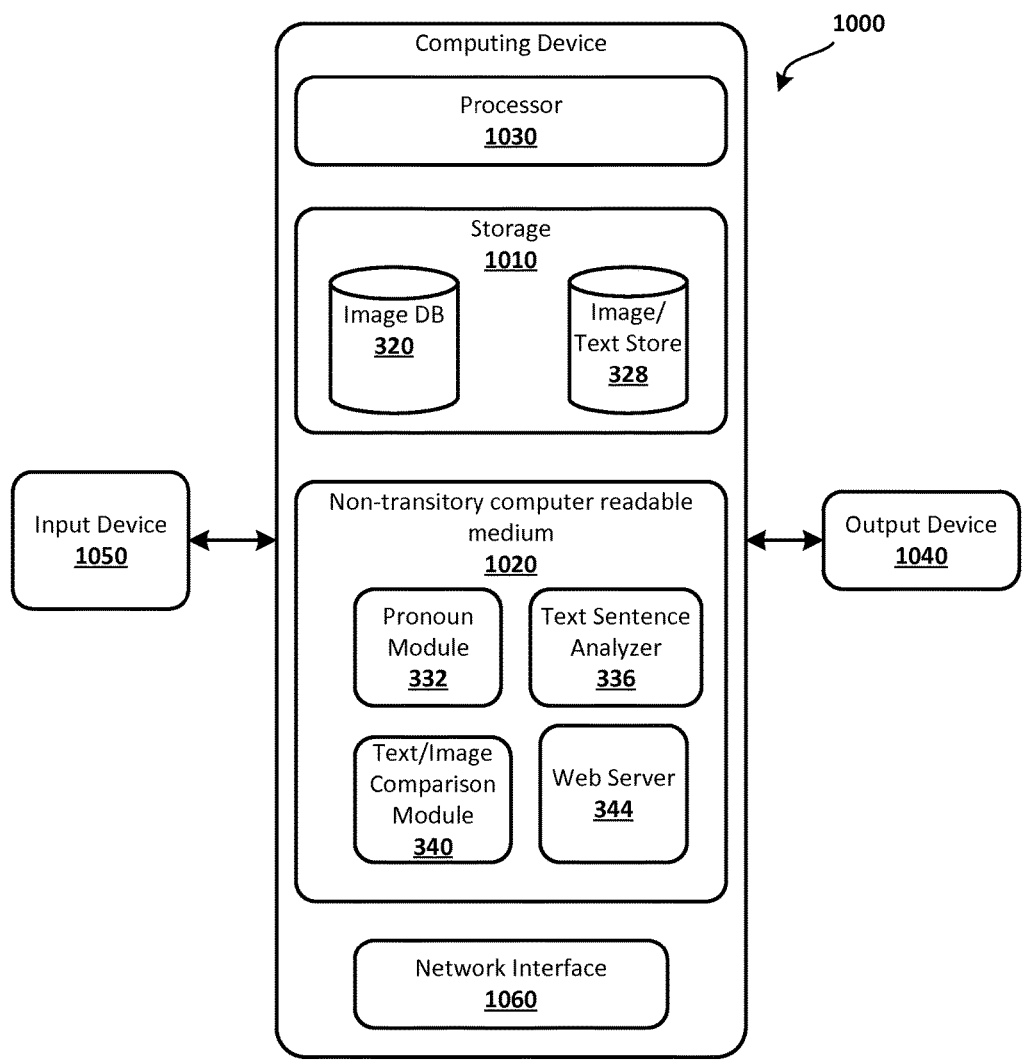
FIG. 4 is a block diagram representing an example computing device that may be used in accordance with an embodiment of the present disclosure.

FIG. 4 is a block diagram representing an example computing device 1000 that may be used to perform any of the techniques as variously described in this disclosure. For example, the user device, the text sentence conversion system, the various modules of the text sentence conversion system depicted in FIG. 3B, or any combination of these may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. In the embodiment of the computing device 1000 shown in FIG. 4, the storage devices 1010 include the image database 320 and the image/text store 328 described above.

The non-transitory computer-readable media 1020 of the computing device 1000 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000. In the embodiment of the computing device 1000 shown in FIG. 4, the non-transitory computer-readable media 1020 include the pronoun module 332, the text sentence analyzer 336, the text/image comparison module 340, and the web server 344 described above.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable I/O peripherals, such as a camera 1052. The computing device 1000 can include and/or be operatively coupled to various suitable devices for performing one or more of the functions as variously described in this disclosure.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system shown in FIGS. 3A and 3B, such as text sentence analyzer 336 and the text/image comparison module 340, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computing device 1000, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Further Example Embodiments

One example of the present disclosure includes a method for converting a text sentence into an image sentence. The method includes receiving a text sentence that includes a plurality of text words that include at least one verb phrase, identifying at least one semantic role associated with the verb phrase, and querying an image database for a single image associated with information matching the at least one semantic role. Responsive to determining that no single image is associated with information matching the at least one semantic role, the text sentence is split into a first sentence fragment and a second sentence fragment, each of the first sentence fragment and the second sentence fragment associated with at least one semantic role. An image database is then queried for a first image associated with information matching the at least one semantic role of the first sentence fragment and a second image associated with information matching the at least one semantic role of the second sentence fragment. In one embodiment of this example method, at least one of the first sentence fragment and the second sentence fragment is an adjunct associated with at least verb phrase. In one embodiment of this example method, the first image and the second image are presented as an image sentence corresponding to the text sentence. In one embodiment of this example method, it is determined whether the first image matches all of the at least one semantic roles of the first sentence fragment and whether the second image matches all of the at least one semantic roles of the second sentence fragment. Optionally, responsive to determining that at least one of the first image and the second image do not correspond to all semantic roles of the first sentence fragment and the second sentence fragment, splitting at least one of the first sentence fragment and the sentence fragment into two more sentence fragments. In one embodiment of this example method, if it is determined that the first image matches all semantic roles of the first sentence fragment and that the second image matches all semantic roles of the second sentence fragment then the first image and the second image are presented as an image sentence corresponding to the text sentence.

Another example of the present disclosure embodies the above example method in a computer program product wherein the computer program product is stored on at least one non-transitory computer-readable medium that includes instructions that when executed by one or more processors cause the above method to be carried out.

Another example of the present disclosure includes a system for converting a text sentence into an image sentence. The system includes at least one processor, and a text sentence analyzer configured for receiving a text sentence comprising a plurality of text words that include at least one verb phrase, identifying at least one semantic role associated with the at least one verb phrase, and splitting the text sentence into a first sentence fragment and a second sentence fragment, each of the first sentence fragment and the second sentence fragment associated with at least one semantic role. The system also includes an image database configured for storing images and corresponding information describing semantic roles of the stored images. The system also includes a text/image comparison module configured for receiving the text sentence, determining at least one semantic role associated with the at least one verb phrase, querying the image database for a single image associated with information matching the semantic roles of all identified verb phrases, and responsive to determining that no single image is associated with information matching the semantic roles identified verb phrases, instructing the text sentence analyzer to split the text sentence into the first sentence fragment and the second sentence fragment. In one embodiment of the system, at least one of the first sentence fragment and the second sentence fragment is an adjunct associated with at least one verb phrase. In one embodiment of the system, the text/image comparison module is further configured for receiving the first sentence fragment and the second sentence fragment from the text sentence analyzer and querying the image database for a first image associated with information matching the at least one semantic role of the first sentence fragment and a second image associated with information matching the at least one semantic role of the second sentence fragment. In one embodiment, the system includes a web server configured for presenting the first image and the second image as an image sentence corresponding to the text sentence. In one embodiment of the system, the text/image comparison module is further configured for determining whether the first image matches all of the at least one semantic roles of the first sentence fragment and whether the second image matches all of the at least one semantic roles of the second sentence fragment, and, responsive to determining that at least one of the first image and the second image do not correspond to all semantic roles of the first sentence fragment and the second sentence fragment, instructing the text sentence analyzer to split at least one of the first sentence fragment and the sentence fragment into two more sentence fragments.

Further Considerations

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A method for converting a text sentence into an image sentence, the method comprising:
   receiving a text sentence comprising a plurality of text words, the plurality of text words including at least one verb phrase;
   identifying at least one semantic role associated with the at least one verb phrase;
   querying an image database for a single image associated with information matching at least one semantic role, the querying including generating a first feature vector of first candidate images in the image database and comparing the first feature vector to the at least one semantic role associated with the at least one verb phrase;
   responsive to determining that no single image is associated with information matching the semantic role, splitting the text sentence into a first sentence fragment and a second sentence fragment, each of the first sentence fragment and the second sentence fragment associated with at least one semantic role; and
   querying the image database for a first image associated with information matching the at least one semantic role of the first sentence fragment and a second image associated with information matching the at least one semantic role of the second sentence fragment, the querying including generating a second feature vector for second candidate images and comparing the second feature vector to the at least one semantic roles of the first sentence fragment and the second sentence fragment.

2. The method of claim 1, wherein at least one of the first sentence fragment and the second sentence fragment includes an adjunct associated with at least one verb phrase.

3. The method of claim 1, further comprising presenting the first image and the second image as an image sentence corresponding to the text sentence.

4. The method of claim 1, further comprising:
   determining whether the first image matches all of the at least one semantic roles of the first sentence fragment and whether the second image matches all of the at least one semantic roles of the second sentence fragment.

5. The method of claim 4, further comprising:
   responsive to determining that at least one of the first image and the second image do not correspond to all semantic roles of the first sentence fragment and the second sentence fragment, splitting at least one of the first sentence fragment and the second sentence fragment into two more sentence fragments.

6. The method of claim 1, further comprising:
determining that the first image matches all semantic roles of the first sentence fragment and that the second image matches all semantic roles of the second sentence fragment; and
presenting the first image and the second image as an image sentence corresponding to the text sentence.

7. A computer program product wherein the computer program product is stored on at least one non-transitory computer-readable medium that includes instructions that when executed by one or more processors cause a process to be carried out, the process comprising:
receiving a text sentence comprising a plurality of text words, the plurality of text words including at least one verb phrase;
identifying at least one semantic role associated with the at least one verb phrase;
querying an image database for a single image associated with information matching at least one semantic role, the querying including generating a first feature vector of first candidate images in the image database and comparing the first feature vector to the at least one semantic role associated with the at least one verb phrase;
responsive to determining that no single image is associated with information matching the semantic role, splitting the text sentence into a first sentence fragment and a second sentence fragment, each of the first and second sentence fragments associated with one of the at least one semantic roles; and
querying the image database for a first image associated with information matching the semantic role of the first sentence fragment and a second image associated with information matching the semantic role of the second sentence fragment, the querying including generating a second feature vector for second candidate images and comparing the second feature vector to the at least one semantic roles of the first sentence fragment and the second sentence fragment.

8. The computer program product of claim 7, wherein at least one of the first sentence fragment and the second sentence fragment includes an adjunct associated with at least one verb phrase.

9. The computer program product of claim 7, further comprising presenting the first image and the second image as an image sentence corresponding to the text sentence.

10. The computer program product of claim 7, further comprising:
determining whether the first image matches all of the at least one semantic roles of the first sentence fragment and whether the second image matches all of the at least one semantic roles of the second sentence fragment.

11. The computer program product of claim 10, further comprising:
responsive to determining that at least one of the first image and the second image do not correspond to all semantic roles of the first sentence fragment and the second sentence fragment, splitting at least one of the first sentence fragment and the second sentence fragment into two more sentence fragments.

12. The computer program product of claim 7, further comprising:
determining that the first image matches all semantic roles of the first sentence fragment and that the second image matches all semantic roles of the second sentence fragment; and
presenting the first image and the second image as an image sentence corresponding to the text sentence.

13. A system for converting a text sentence into an image sentence, the system comprising:
at least one processor;
a text sentence analyzer configured for:
receiving a text sentence comprising a plurality of text words, the plurality of text words including at least one verb phrase;
identifying at least one semantic role associated with the at least one verb phrase;
splitting the text sentence into a first sentence fragment and a second sentence fragment, each of the first sentence fragment and the second sentence fragment associated with at least one semantic role;
an image database configured for storing images and corresponding information describing semantic roles of the stored images;
a text/image comparison module configured for:
receiving the text sentence;
determining at least one semantic role associated with the at least one verb phrase;
querying the image database for a single image associated with information matching the semantic roles of the at least one verb phrase, the querying including generating a feature vector of a candidate image in the image database and comparing the feature vector of the candidate image to the semantic roles associated with the at least one verb phrase; and
responsive to determining that no single image is associated with information matching the semantic roles of the at least one verb phrase, instructing the text sentence analyzer to split the text sentence into the first sentence fragment and the second sentence fragment.

14. The system of claim 13, wherein at least one of the first sentence fragment and the second sentence fragment is an adjunct associated with the at least one verb phrase.

15. The system of claim 13, wherein the text/image comparison module is further configured for:
receiving the first sentence fragment and the second sentence fragment from the text sentence analyzer; and
querying the image database for a first image associated with information matching the at least one semantic role of the first sentence fragment and a second image associated with information matching the at least one semantic role of the second sentence fragment, the querying including generating a first feature vector for the first image and a second feature vector the second image, and comparing the first feature vector and the second feature vector to the at least one semantic roles of the first sentence fragment and the second sentence fragment, respectively.

16. The system of claim 15, further comprising a web server configured for presenting the first image and the second image as an image sentence corresponding to the text sentence.

17. The system of claim 15, wherein the text/image comparison module is further configured for:
determining whether the first image matches all of the at least one semantic roles of the first sentence fragment and whether the second image matches all of the at least one semantic roles of the second sentence fragment.

18. The system of claim 17, wherein the text/image comparison module is further configured for:
- responsive to determining that at least one of the first image and the second image do not correspond to all semantic roles of the first sentence fragment and the second sentence fragment, instructing the text sentence analyzer to split at least one of the first sentence fragment and the second sentence fragment into two more sentence fragments.

\* \* \* \* \*